United States Patent [19]

Taylor et al.

[11] 4,311,615

[45] Jan. 19, 1982

[54] ELECTRICALLY CONDUCTIVE PALLADIUM CONTAINING POLYIMIDE FILMS

[76] Inventors: Robert A. Frosch, Administrator of the National Aeronautics and Space Administration, with respect to an invention of Larry T. Taylor, Blacksburg; Anne K. St. Clair, Poquoson, both of Va.; Vicki C. Carver, Abilene, Tex.; Thomas A. Furtsch, Cookeville, Tenn.

[21] Appl. No.: 135,058

[22] Filed: Mar. 28, 1980

[51] Int. Cl.$^3$ ............................................... H01B 1/02
[52] U.S. Cl. ...................................................... 252/514
[58] Field of Search ........................................ 252/514

[56] References Cited

U.S. PATENT DOCUMENTS 3,073,784  1/1963  Endrey ................................. 252/514
3,718,488  2/1973  Trofimenko ......................... 252/514

Primary Examiner—Joseph L. Schofer
Assistant Examiner—N. Salofim
Attorney, Agent, or Firm—Wallace J. Nelson; John R. Manning; Howard J. Osborn

[57] ABSTRACT

This invention relates to improved lightweight, high temperature resistent, electrically conductive, palladium containing, polyimide films and methods of preparing same for use in aerodynamic and space application. A palladium (II) ion-containing polyamic acid solution is prepared by reacting an aromatic dianhydride with an equimolar quantity of a palladium II ion-containing salt or complex and the reactant product is cast as a thin film onto a surface and cured at approximately 300° C. to produce a flexible electrically conductive cyclic palladium containing polyimide. The source of palladium ions is selected from the group of palladium II compounds consisting of $LiPdCl_4$, $Pd[S(CH_3)_2]_2Cl_2$, $Na_2PdCl_4$, and $PdCl_2$.

12 Claims, No Drawings

ELECTRICALLY CONDUCTIVE PALLADIUM CONTAINING POLYIMIDE FILMS

ORIGIN OF THE INVENTION

The invention described herein was made jointly by an employee of the United States Government and by others in the performance of work under a NASA Grant and is subject to the provisions of Section 305 of the National Aeronautics and Space Act of 1958, Public Law 85-568 (72 Stat. 435; USC 2457).

BACKGROUND OF THE INVENTION

A need exists for high temperature, ultra-thin, polymeric film for aeronautics and space applications. A successful candidate material must be lightweight, thermally stable, flexible, and possess antistatic properties with an electrical resistivity of $10^8$–$10^{10}$ ohm-cm for the purpose of relieving space charging effects.

Linear aromatic polyimides are presently being considered as candidates for large space structural applications. However, a problem arises in that linear condensation polyimides are not electrically conductive by nature and possess an electrical resistivity of approximately $10^{17}$ ohm-cm.

Polymers which do conduct an electric current have received considerable attention in the chemical literature. Although a few polymeric systems such as $(SN)_x$, polyacetylene, and poly(p-phenylene) have conducting properties when complexed with electron donors or acceptors, the majority of polymers do not. One of the most common methods for imparting electrical conductivity into insulative polymers is the incorporation of conductive fillers. To date fillers have been introduced at rather high concentrations and are primarily particulate in nature such as metals, carbon fibers or spheres. Attempts at lowering the resistivity of polyimide films have been made by doping the polymers with metals such as aluminum or with carbon microspheres. Such attempts, however, have unfortunately led to an unwanted increase in the weight of the material, a much embrittled film, uneven dispersion of metal throughout the film and a degradation in thermal and mechanical properties.

The doping of polymers with metal "ions" has received little attention and has produced only marginal success to date in enhancing electrical properties. In U.S. Pat. No. 3,073,785 Angelo disclosed the incorporation of bis(acetylacetonato) copper (II) into a polyimide which resulted in a significant reduction in volume resistivity from $10^{17}$ to $10^{12}$–$10^{13}$ ohm-cm. However, this is still inadequate for bleeding off static charges in space applications and a definite need still exists for a further reduction in the electrical resistivity of polyimide film.

It is therefore an object of the present invention to provide an improvement in the electrical conductivity of linear aromatic polyimides.

Another object of the present invention is a method of preparing high temperature, electrically conductive palladium containing polyimide film.

A further object of the present invention is a method of making palladium ion-containing polyamic acids and ultimately thin, flexible and lightweight palladium containing polyimide film for potential use in space applications.

BRIEF DESCRIPTION OF THE INVENTION

According to the present invention, the foregoing and additional objects are attained by providing an improved high temperature palladium containing polyimide film which is lightweight, retains flexibility in the fully cured state, and which is electrically conductive.

The process for producing an electrically conductive, palladium containing polyimide film according to the present invention involves the following steps: (1) preparation of the polyamic acid in a polar organic solvent; (2) addition of palladium ions in the form of lithium tetrachloropalladate (II) ($Li_2PdCl_4$), bis(dimethylsulfide)dichloropalladium (II) ($Pd[S(CH_3)_2]_2Cl_2$), sodium tetrachloropalladate (II) ($Na_2PdCl_4$), or palladium chloride ($PdCl_2$); (3) fabrication of a thin film of the "palladium (Pd)-polyamic acid complex" by casting on a flat surface; and (4) thermal imidization of the Pd ion-containing polyamic acid to the palladium containing polyimide by heating in air at 300° C. Preparation of the palladium ion-containing polyamic acid involves the addition of an equimolar quantity of 3,3'4,4'-benzophenone tetracarboxylic acid dianhydride (BTDA) to a stirred solution of 4,4'-oxydianiline (4,4'-ODA) in a polar organic solvent, preferably an amide-type solvent. Successful results are attained by adding the palladium salt or complex immediately following the dianhydride thereby producing an "in situ" method of reaction, or by adding the metal well after the polyamic acid polymerization has gone to completion. Although other concentrations have been tested and may be used, the most successful results have been obtained using a 1:4 mole ratio of the metal species to the polymeric acid. The reaction should be conducted below 50° C. to ensure formation of 100% of the polyamic acid. The Pd/polyamic acid that forms after several hours is a viscous, smooth polymeric solution which can range in color depending upon the particular metal species that has been added and which possesses an inherent viscosity of at least 0.4 dl/g when measured at 0.5% solids in an amide solvent at 35° C.

The palladium ion-containing polyamic acid is characterized by a recurring unit with the following structural formula:

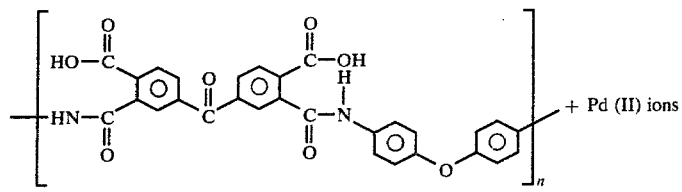

where, n=number of repeat units to produce a high (10,000–30,000) molecular weight polymer.

Although the dianhydride BTDA was used for the specific example polymerizations, other dianhydrides that may be employed according to the present invention include: bis(3,4-dicarboxyphenyl)ether dianhydride, bis-4-(3',4'dicarboxyphenoxy)diphenyl sulfone dianhydride, bis(3,4-dicarboxyphenyl)sulfone dianhydride, 2,2-bis(3-4-dicarboxyphenyl) hexafluoropropane dianhydride, pyromellitic dianhydride, and 4,4'-bis-(3,4-dicarboxyphenoxy)diphenyl sulfide dianhydride. The diamine that was used in the specific example polymerizations was 4,4'-ODA, but other aromatic diamines useful in the present invention include: 3,3'-oxydianiline, 3,4'-oxydianiline, any isomer of diaminobenzophenone, any isomer of diaminodiphenylmethane, meta-phenylene diamine, para-phenylene diamine, and any isomer of diaminodiphenyl sulfone. Regardless of the monomers used, a major criterion for achieving success is that the polyamic acid solution provides a medium in which the added metal species will be highly soluble.

Ultimate success of the metal containing polyimide of the present invention as an electrically conductive film is dependent upon the presence of palladium (II) ions in the form of a palladium salt or complex. The best results were obtained when $Li_2PdCl_4$, $Pd[S(CH_3)_2]_2Cl_2$, and $PdCl_2$ served as the source of metal as shown in Table II. In addition, the use of $Na_2PdCl_4$, also produced a decrease in the volume resistivity of the BTDA+4,4'-ODA polyimide of two orders of magnitude. The following variations in the anions or cations of the metal complexes were found inappropriate for the polymerization of the present invention: $Pd(NH_3)_2Cl_2$, $Pd(acac)_2$(palladium acetylacetonate), $K_2PdCl_4$, $PtCl_2$, $Pt(NH_3)_2Cl_2$, $K_2PtCl_4$, and $Pt[S(CH_3)_2]_2Cl_2$. The failure of these metal additives to improve polymer electrical conductivity was due to insufficient solubility of these salts or complexes in the solvent polyamic acid solution. Any palladium containing salt or complex that does display high solubility in the solvent polyamic acid mixture should be a viable candidate for use in the present invention.

Although N,N-dimethylacetamide (DMAc) was used as the solvent for the specific example polymerizations, other solvents having a high affinity for the polar chemical groups of the aromatic Pd/polyamic acid intermediate may be employed. Other solvents useful in the present invention include amide-type solvents such as N,N-dimethylformamide or N-methyl-2-pyrrolidone, dimethylsulfone, and ether-type solvents such as tetrahydrofuran, m- and p-dioxane, bis(2-methoxyethyl)ether or 1,2-bis(2-methoxyethoxy) ethane. A mixture of any of the above mentioned solvents may be used as long as efficient solubility is provided for the metal species when mixed with the polyamic acid.

The quantity of solvent used in preparing the Pd/polyamic acid intermediate need only be sufficient to dissolve the monomers and metal species and provide viscosity suitable for film casting. Successful results were obtained when the solvent comprised at least 85% of the Pd/polyamic acid solution.

The quantity of palladium (II) ions present in films described in the specific example polymerizations was dependent on the molecular weight of the metal species used. A 1:4 mole ratio of palladium salt or complex to the polyamic acid was employed. However, there appears to be an optimum palladium content for these films. For example, several $Li_2PdCl_4$-containing BTDA+4,4'-ODA films were prepared with differing concentrations of palladium. The volume resistivity of each film with its measured palladium content was as follows: $10^{15}$ohm-cm, 2.31% Pd; $10^{10}$ohm-cm, 4.72% Pd; and $10^9$ohm-cm, 8.76% Pd. Further increase in the amount of palladium resulted in no further resistivity lowering.

The palladium ion-containing solutions so obtained were cast into thin films by pouring onto soda-lime glass plates in an enclosed dust free, low humidity area. Although glass plates were used for film casting in the specific examples, any flat surface may be used such as Teflon, aluminum, or stainless steel. Solutions were spread so as to ensure a final film thickness of approximately 1 mil. The Pd/polyamic acid films were cured in air at 300° C. after removal of most of the solvent.

The employment of XPS (X-ray Photoelectron Spectroscopy) has indicated that the palladium (II) of the Pd/polyamic acid intermediate is reduced to the elemental state during the cure for those films that conduct electricity. As shown in Table I, the binding energies for Pd $3d_{5/2}$ and $3d_{3/2}$ in the first four polymer films listed agree closely with those for the base palladium metal. Binding energies associated with ionic palladium (II) in $PdCl_2$, for example, occur at higher eV. As determined from the XPS spectra, polymer films containing $Li_2PdCl_4$, $Pd[S(CH_3)_2]_2Cl_2$, and $PdCl_2$ showed no hint at all of ionic Pd (II). However, the spectrum of the film containing $Na_2PdCl_4$ showed a significant amount of Pd (II) on the surface of the film. Inadequate reduction of $Na_2PdCl_4$ coupled with the lower solubility of the species in the solvent used, accounts for the lesser degree of conductivity displayed by this film.

TABLE I

| XPS Data for Palladium - Containing BTDA + 4,4'-ODA Polymer Films | | |
|---|---|---|
| Film | Binding Energies for Pd $3d_{5/2}$ (eV) | Binding Energies for Pd $3d_{3/2}$ (eV) |
| Polymer + $Li_2PdCl_4$ | 335.2 | 340.2 |
| Polymer + $Pd[S(CH_3)_2]_2Cl_2$ | 334.7 | 340.9 |
| Polymer + $Na_2PdCl_4$ | 336.2 | 341.6 |
| Polymer + $PdCl_2$ | 334.3 | 339.5 |
| Pd metal | 335.2 | 340.8 |
| $PdCl_2$ | 337.3 | 342.6 |

SPECIFIC EXAMPLES

Example I

Preparation of the polyamic acid complex of $Li_2PdCl_4$/BTDA+4,4'-ODA was conducted at room temperature. A 20% solids stock solution of the polyamic acid of BTDA+4,4'-ODA was prepared by dissolving 6.0072 g (0.030 mole) of 4,4'-ODA in 67 ml DMAc. Once the diamine was completely dissolved, 9.6672 g (0.030 mole) BTDA was added at once to the diamine solution while stirring. After three hours time, the polyamic acid solution was clear yellow and viscous with an inherent viscosity of 1.6 dl/g when measured at 0.5% solids in DMAc at 35° C. To 8.00 g of this BTDA+4,4'-ODA stock solution was added 0.20 g $Li_2PdCl_4$ dissolved in 2.0 ml DMAc. Complete mixing of the metal species with the polymer was obtained after approximately 30 minutes stirring.

A film of the $Li_2PdCl_4$/BTDA+4,4'-ODA solution was cast on plate glass using a 15 mil blade gap and then placed in an oven at 60° C. for two hours to evaporate the solvent. The film was then cured one hour at 100° C., one hour at 200° C. and one hour at 300° C. in a forced air oven. After slow cooling to room temperature, the film was removed from the glass. The resulting palladium containing BTDA+4,4'-ODA film was very dark and metallic in appearance, flexible, and electrically conductive.

Example II.

Preparation of the polyamic acid complex of Pd[S(CH$_3$)$_2$]$_2$Cl$_2$/BTDA+4,4'-ODA was conducted as in Example I. To 8.00 g of BTDA+4,4'-ODA stock solution (20% solids) was added 0.20 g Pd[S(CH$_3$)$_2$]$_2$Cl$_2$ dissolved in 2.0 ml DMAc. A film of this material cured to 300° C. as in Example 1 was of excellent quality—flexible, red-brown and metallic in appearance on the side of the film exposed to the atmosphere, and electrically conductive.

Example III

Preparation of the polyamic acid complex of Na$_2$PdCl$_4$/BTDA+4,4'-ODA was conducted as in Example I. Na$_2$PdCl$_4$ (0.20 g) was dissolved in 2.0 ml DMAc by heating to approximately 80° C. and stirring. Once dissolved the metal solution was cooled to room temperature and added to 8.00 g of the BTDA+4,4'-ODA stock solution (20% solids). After 45 minutes stirring a film was cast and cured to 300° C. as in Example I. The resulting flexible film was black and opaque in appearance, and slightly electrically conductive.

Example IV

Preparation of the polyamic acid complex of PdCl$_2$/BTDA+4,4'-ODA was conducted as in Example I. PdCl$_2$ (0.15 g) was dissolved in 1.5 ml DMAc by heating as in Example III. After the metal solution had cooled to room temperature, the solution was filtered. The filtrate was added to 6.00 g BTDA+4,4'-ODA stock solution (20% solids) and allowed to stir until the solution was uniform. A film cast from the PdCl$_2$/polyamic acid was cured at 300° C. in Example I. The resulting flexible, red-brown film was transparent in appearance and electrically conductive.

Properties of the films prepared as in Examples I-IV are given in Table II and compared with those of a film prepared from the BTDA+4,4'-ODA stock solution containing no added metal.

TABLE II

Properties of Palladium and Non-Palladium BDTA + 4,4'-ODA Polymer Films

| Film | Volume Resistivity[a] (ohm-cm) | Surface Resistivity (ohm-cm) | Metal Content | $T_g$[b] (°C.) |
|---|---|---|---|---|
| Polymer alone | 1.0 × 10$^{17}$ | 1.0 × 10$^{17}$ | 0 | 282 |
| Polymer + Li$_2$PdCl$_4$ | 6.1 × 10$^{10}$ | 4.5 × 10$^7$ | 0.17% Li 5.33% Pd | 330 |
| Polymer + Pd[S(CH$_3$)$_2$]$_2$Cl$_2$ | 3.3 × 10$^{10}$ | very low[c] (overloaded) | 0.23% S 7.02% Pd | 343 |
| Polymer + Na$_2$PdCl$_4$ | 2.3 × 10$^{15}$ | | 1.36% Na 4.69% Pd | 372 |
| Polymer + PdCl$_2$ | 2.3 × 10$^{11}$ | | 2.97% Pd | 281 |

[a]Electrical resistivities were measured according to ASTM method of test D257-66.
[b]Glass transition temperatures determined by thermomechanical analysis at 5° C./min. in static air.
[c]Unmeasurable due to overloading at 10 volts and therfore conclusive that the film had a lower resistivity than was measurable by the standard ASTM method of testing (Kiethley Electric Conductivity Unit).

These results show that the addition of Li$_2$PdCl$_4$ and Pd[S(CH$_3$)$_2$]$_2$CL$_2$ to the BTDA+4,4'-ODA polyimide caused a dramatic decrease in the volume and surface electrical resistivities of the polymer films. For the Pd[S(CH$_3$)$_2$]$_2$Cl$_2$/polyimide film, which possessed a highly metallic appearance, surface resistivities were so low that the instrument overloaded of electrification voltages as low as 10 volts regardless of the side of the film being measured. The addition of palladium (II) species to BTDA+4,4'-ODA is an improvement over the prior attempts at doping polyimides with heavy metals or carbon in order to gain electrically conductive properties. At a concentration of only 5-7% palladium, the antistatic polyimide films of the present invention display electrical resistivities (10$^7$-10$^{10}$ ohm-cm) low enough to relieve space-charging effects. Electrical conductivity of these films has been achieved with a minimum increase in the weight of the film and without a loss in film flexibility. These features make palladium containing polyimides attractive for use in future space applications.

The above specific examples are considered illustrative of the invention and there may be modifications and variations in the palladium (II) species or in the polyimide therein that will be apparent to those skilled in the art without departing from the spirit and scope of the invention as set forth herein. For example, although the invention has been specifically described as useful in the preparation of conductive films for space applications the palladium ion-containing polyamic acid solution may also be used as electrically conductive films, coatings or paints in any application where it is desirable to bleed off static charges. These and other applications of the present invention will be readily apparent to those skilled in the art in the light of the above teachings. It is therefore to be understood that the invention may be practiced otherwise than as specifically described and claimed herein.

What is claimed as new and desired to be secured by Letters Patent of the United States is:

1. A method for preparing a palladium (II) ion-containing polyamic acid solution which comprises:
    reacting an aromatic dianhydride with an equimolar quantity of an aromatic diamine followed by the addition of a palladium (II) ion-containing salt or complex selected from the group consisting of Li$_2$PdCl$_4$, Pd[S(CH$_3$)$_2$]$_2$Cl$_2$ and PdCl$_2$;
    the dianhydride and diamine reactants being previously dissolved in a solvent or mixture of solvents at least one of which is selected from the group consisting of,
    N,N-dimethylacetamide,
    N,N-dimethylformamide,
    N-methyl-2-pyrrolidone,
    dimethylsulfone,
    tetrahydrofuran,
    m- or p-dioxane,
    bis(2-methoxyethyl)ether, and
    1,2-bis(2-methoxyethoxy)ethane.
2. The method of claim 1 wherein the diamine is selected from the group of aromatic diamines consisting of:
    3,3'-, 3,4'-, or 4,4'-oxydianiline;
    3,3'-, 3,4-, or 4,4'-diaminobenzophenone;
    3,3'-, 3,4'-, or 4,4'-diaminodiphenylmethane; meta- or para-phenylenediamine; and
    3,3'-, 3,4'-, or 4,4'-diaminodiphenylsulfone.
3. A method of claim 1 wherein the dianhydride is selected from the group of aromatic dianhydrides consisting of:
    3,3'-, 4,4'-benzophenone tetracarboxylic acid dianhydride, bis(3,4-dicarboxyphenyl)ether dianhydride, bis(3,4-dicarboxyphenyl)sulfone dianhydride,
bis-4-(3',4'-dicarboxyphenoxy)diphenyl sulfone dianhydride,
2,2-bis(3,4-carboxyphenyl)hexafluoropropane dianhydride, pyromellitic dianhydride, and
4,4'-bis-(3,4-dicarboxyphenoxy)diphenylsulfide dianhydride.

4. The method of claim 1 wherein the diamine-dianhydride-palladium salt reactant product is a palladium ion-containing aromatic polyamic acid which has recurring units of the formula:

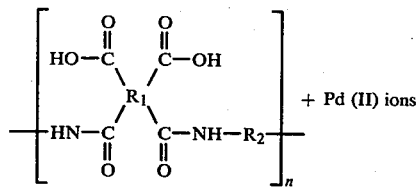

where $R_1$ is selected from the group consisting of

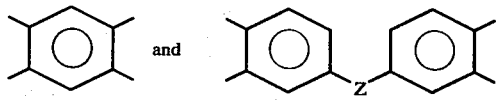

where Z is selected from

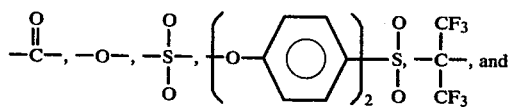

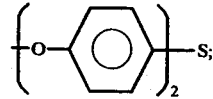

and, where $R_2$ is selected from the group consisting of

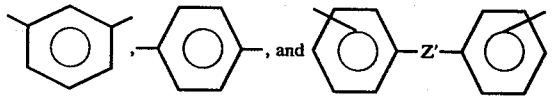

where Z' is selected from

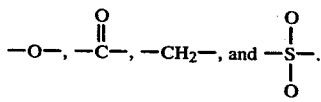

5. The method of claim 1 wherein the source of palladium (II) ions is lithium tetrachloropalladate (II) ($Li_2PdCl_4$).

6. The method of claim 1 wherein the source of palladium (II) ions is bis(dimethylsulfide)dichloropalladium (II) ($Pd[S(CH_3)_2]_2Cl_2$).

7. The method of claim 1 wherein the source of palladium (II) ions is palladium chloride ($PdCl_2$).

8. The method of claim 1 including the further step of recovering an electrically conductive palladium containing polyimide film by casting a thin film of the palladium ion-containing polyamic acid solution onto a surface, and heating the film in air at 300° C. to produce a flexible, electrically conductive, cyclic palladium containing polyimide having the recurring units of the formula:

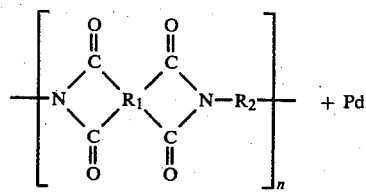

where $R_1$ is selected from the group consisting of

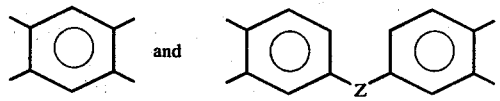

where Z is selected from

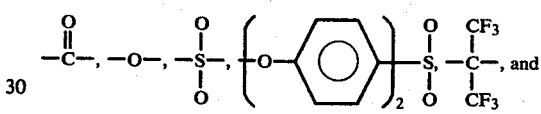

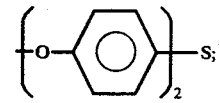

and, where $R_2$ is selected from the group consisting of

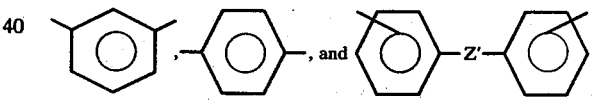

where Z' is selected from

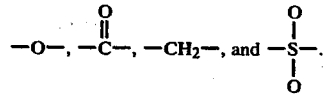

9. The method of claim 8 wherein the volume resistivity of the recovered polyimide film is on the order of $6.1 \times 10^{10}$ ohm-cm and the film surface resistivity in on the order of $4.5 \times 10^{-7}$ ohm-cm.

10. The method of claim 9 wherein the palladium ion source for the conductive film is $Li_2PdCl_4$.

11. The method of claim 8 wherein the volume resistivity of the recovered polyimide film is on the order of $3.3 \times 10^{10}$ ohm-cm and the film surface resistivity is of such a low value as to prevent measurement by the standard ASTM method of testing.

12. The method of claim 11 wherein the palladium ion source for the conductive film is $Pd[S(CH_3)_2]_2Cl_2$.

* * * * *